United States Patent [19]

Ichikawa et al.

[11] Patent Number: 5,409,361
[45] Date of Patent: Apr. 25, 1995

[54] CENTER MECHANISM OF TIRE CURING PRESS

[75] Inventors: Katsumi Ichikawa; Yoshimata Maikuma, both of Kobe, Japan

[73] Assignee: Kabushiki Kaisha Kobe Seiko Sho, Kobe, Japan

[21] Appl. No.: 974,897

[22] Filed: Nov. 12, 1992

[30] Foreign Application Priority Data

Nov. 14, 1991 [JP] Japan ................. 3-326958

[51] Int. Cl.⁶ .................. B29C 35/02; B29D 30/06
[52] U.S. Cl. ........................ 425/48; 425/43; 425/52; 425/58
[58] Field of Search ............ 425/33, 36, 38, 43, 425/48, 52, 58

[56] References Cited

U.S. PATENT DOCUMENTS

| | | | |
|---|---|---|---|
| 2,743,480 | 5/1956 | Frank | 425/33 |
| 2,790,205 | 4/1957 | Parker | 425/52 |
| 3,029,469 | 4/1962 | Moore et al. | 425/33 |
| 3,890,073 | 6/1975 | Getz | 425/33 |
| 4,391,769 | 7/1983 | Ichikawa et al. | 264/326 |
| 4,669,964 | 6/1987 | Amano et al. | 425/34.1 |
| 4,695,234 | 9/1987 | Amano et al. | 425/23 |
| 4,702,669 | 10/1987 | Ichikawa et al. | 414/749 |
| 4,804,318 | 2/1989 | Fujieda et al. | 425/34.1 |
| 4,834,636 | 5/1989 | Ichikawa et al. | 425/38 |
| 4,872,822 | 10/1989 | Pizzorno | 425/48 |
| 4,874,303 | 10/1989 | Ichikawa et al. | 425/28.1 |
| 4,927,344 | 5/1990 | Amano et al. | 425/28.1 |
| 4,950,141 | 8/1990 | Maikuma et al. | 425/33 |
| 5,106,280 | 4/1992 | Sakaguchi | 425/52 |

FOREIGN PATENT DOCUMENTS

| | | | |
|---|---|---|---|
| 1173366 | 2/1959 | France | 425/44 |
| 60-94313 | 5/1985 | Japan | 425/52 |
| 1024299 | 6/1983 | U.S.S.R. | 425/48 |
| 1147578 | 3/1985 | U.S.S.R. | 425/40 |
| 269477 | 3/1986 | U.S.S.R. | 425/52 |

Primary Examiner—James P. Mackey
Attorney, Agent, or Firm—Oblon, Spivak, McClelland, Maier & Neustadt

[57] ABSTRACT

Disclosed is a center mechanism of a tire curing press which is capable of easy installation and removal of a bladder assembly. The center mechanism comprises the bladder assembly with the upper and lower ends of a bladder supported with upper and lower support members, a piston rod vertically moving into, and out of, engagement with the upper support members, and a lift cylinder vertically moving into, and out of, engagement with the lower support members. In this center mechanism, there is provided a stepped projecting section formed large in diameter in the upper part and small in diameter in the lower part; the upper support members can easily be installed to, and removed from, the upper end of the piston rod by the use of a stepped block which engages the stepped projecting section and is horizontally divided into a plurality of segments, and a restricting member for restricting the horizontal movement of the stepped block, thereby enabling easy installation and removal of the bladder assembly.

1 Claim, 5 Drawing Sheets

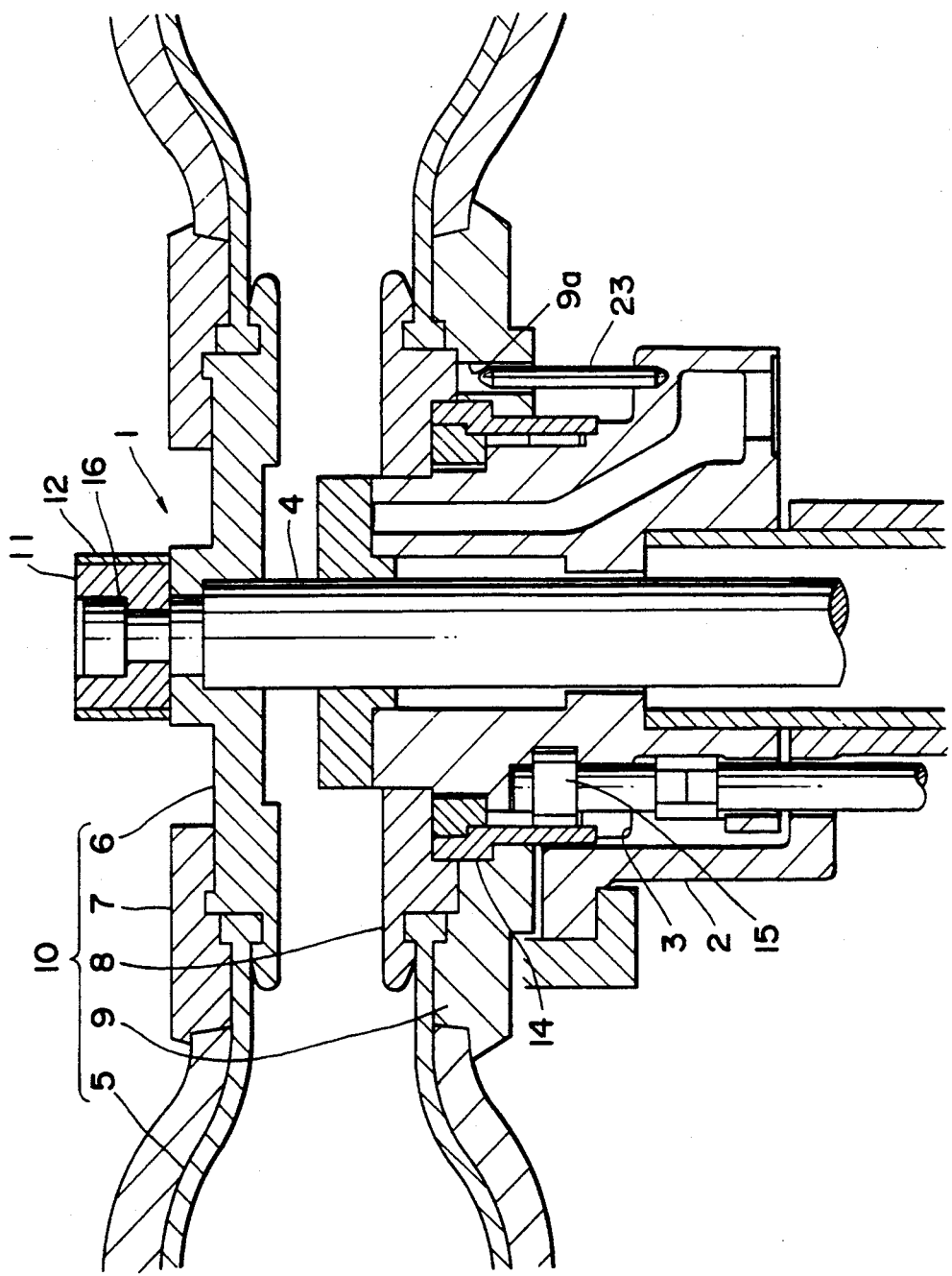

F I G . 3
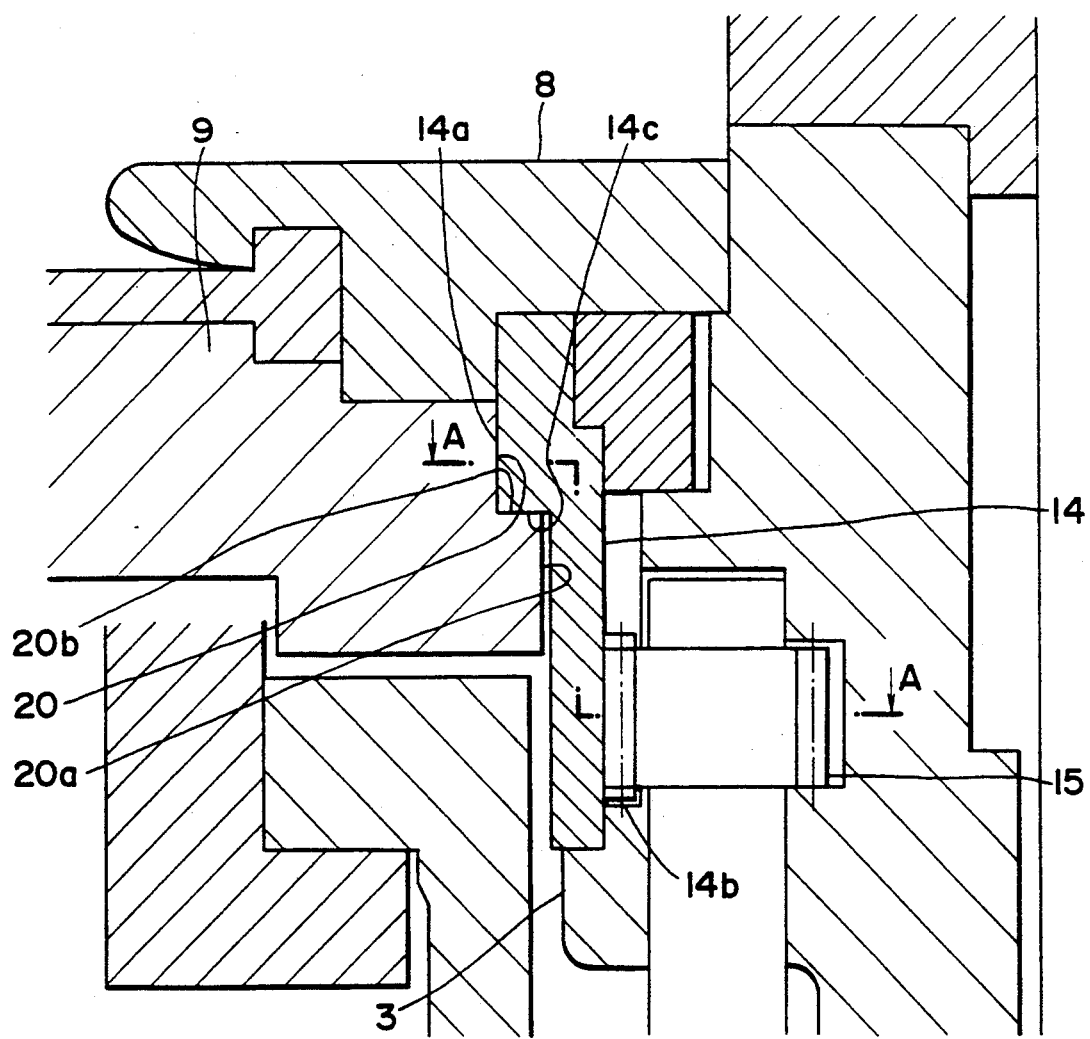

CENTER MECHANISM OF TIRE CURING PRESS

BACKGROUND OF THE INVENTION

1. Field of the Invention

The present invention relates to a center mechanism of a tire curing press which holds and lifts a bladder assembly and, more particularly, to a center mechanism which is able to easily mount and remove the bladder assembly.

2. Description of the Related Art

As this type of center mechanism of a tire curing press, a center mechanism shown in FIG. 5 has been known.

FIG. 5 shows a green tire 36 under forming by curing with the green tire 36 placed in between a lower mold 33 fixedly installed on a base frame 31 through a lower mold mounting member 32 and an upper mold 35 which can be closed and opened in relation to the lower mold 33 and with both the molds 33 and 35 closed. A center mechanism 37 is mounted through a guide sleeve 38 at the central section of the lower mold mounting member 32. This center mechanism 37 is composed of a lift cylinder 39 vertically movably inserted in the guide sleeve 38, a piston rod 40 vertically movably inserted the lift cylinder 39, and a bladder assembly 50 with the upper end of a bladder 45 held between an upper clamp ring 46 and an upper bead ring 47 and with the lower end held between the lower clamp ring 48 and the lower bead ring 49. At the central section of the upper clamp ring 46 is formed a stepped projecting section 46a; and split-type rod clamp 55 having a stepped projecting section 55a which engages with the above-mentioned stepped projecting section 46a is connected by a bolt 56, and is fastened by a bolt 57 to the upper end of the piston rod 40, thereby removably mounting the upper clamp ring 46 on the upper end of the piston rod 40. On the inner periphery of the lower clamp ring 48 is formed an internal thread section 48a. This internal thread section 48a, engages with an external thread section 60a formed on the outer periphery of the clamp ring hub 60 which is fixedly installed on the upper end of the lift cylinder 39, thus removably mounting the lower clamp ring 48 to the lift cylinder 39. The clamp ring hub 60 is provided with a supply-discharge hole 60b for leading a thermal pressure medium, such as steam, hot gas, etc., into the bladder 45 from a thermal pressure medium supply-discharge pipe 61.

Next, the mode of operation of the tire curing press and its center mechanism described above will be explained. The bladder 45 is tensioned in an extended state with the lift cylinder 39 placed in the bottom position and with the piston rod 40 placed in the top position, then the green tire 36 is inserted into the lower mold 33. After the insertion of the tire 36, the piston rod 40 is lowered to move the upper clamp ring 46 downward until the bladder 45 conforms to the inner surface of the tire 36 while being curved and deformed. Then, a thermal pressure medium is injected into the bladder 45 to fully expand, for shaping, the bladder into close contact with the inner surface of the tire 36. Subsequently, the upper mold 35 is closed to the lower mold 33 and applied, for forming by curing with the pressure of the pressure cylinder which is not illustrated. After the cure, the upper mold 35 is opened and retreated to allow the lift cylinder 39 to move upward together with the piston rod 40, and then the tire 36 is separated and raised off the lower mold 33. Subsequently the piston rod 40 is moved upward, while the lift cylinder 39 is moved downward, thus pulling out the bladder 45 from the inner surface of the tire 36 with which the bladder 45 is in close contact. Next, this post-cure tire 36 is taken out upward by means of a tire unloader or other means not illustrated, being discharged out of the curing press.

The center mechanism of the tire curing press described in the related art, however, has the following disadvantage that when mounting the bladder assembly 50 to, and removing it from, the center mechanism, the upper clamp ring 46 is bolted to the upper bead ring 47, and the lower clamp ring 48 turned to engage the thread section 48a with the thread section 60a, attaching or detaching the lower clamp ring 48 on the lift cylinder 39. This operation, carried out in a limited space, however, requires much time and labor. This bladder 45, undergoing repeated expansion and deformation at every curing cycle under a high-temperature and high-pressure environment, requires replacement with a new part every 5 to 8 days.

SUMMARY OF THE INVENTION

In view of the above-described disadvantages inherent in the related art, the present invention has as its object the provision of a center mechanism of a tire curing press capable of easy mounting and removal of a bladder assembly.

In an attempt to accomplish the above-mentioned object, the center mechanism of the tire curing press of the present invention comprises a bladder assembly with the upper and lower ends supported with an upper and a lower support member, a piston rod which is removably engaged with the upper support member and moves vertically, and a lift cylinder which is removably engaged with the lower support member and moves vertically; in this center mechanism, there is provided, on the upper end of the piston rod, a stepped projecting section having a large-diameter upper part and a small-diameter lower part. The upper support member is removably installed on the upper end of the piston rod by a stepped block which is split into a plurality of segments in the horizontal direction and engaged with this stepped projecting section, and by a restricting member which restricts the horizontal movement of this stepped block.

Furthermore, in the center mechanism of the tire curing press including the bladder assembly with the upper and lower ends thereof held with the upper support member and the lower support member, the piston rod which is removably engaged with the upper support member and moves vertically, and a lift cylinder which is removably engaged with the lower support member and moves vertically, a large-diameter bore having a plurality of projecting sections i provided in the lower part of the lower support section, and also an engaging member is rotatably provided which goes into the large-diameter bore of the lower support member through between these projecting sections and engages with the upper end of the projecting sections, so that the lower support member can be installed to, and removed from, the lift cylinder by turning this engaging member.

The upper support member is removably installed on the upper end of the piston rod by restricting or releasing, by a restricting member, the horizontal movement of the stepped block which fixes the upper support member on the upper end of the piston rod in engagement with the stepped projecting section on the upper end of the piston rod.

Furthermore, where a large-diameter bore having a plurality of projecting sections is provided in the lower part of the lower support member, and an engaging member which enters the large-diameter bore of the lower support member through between these projecting sections, engaging with the upper end of the projecting sections, the lower support member is removably installed to the lift cylinder by turning the engaging member to move the engaging member into engagement with, or out of engagement from, the upper end of the projecting sections of the lower support member.

BRIEF DESCRIPTION OF THE DRAWINGS

FIG. 1 is a sectional view showing a center mechanism of a tire curing press of the present invention;

FIG. 3 is a sectional view showing a lower bead ring and an engaging member;

DESCRIPTION OF THE PREFERRED EMBODIMENT

Figure 2A:
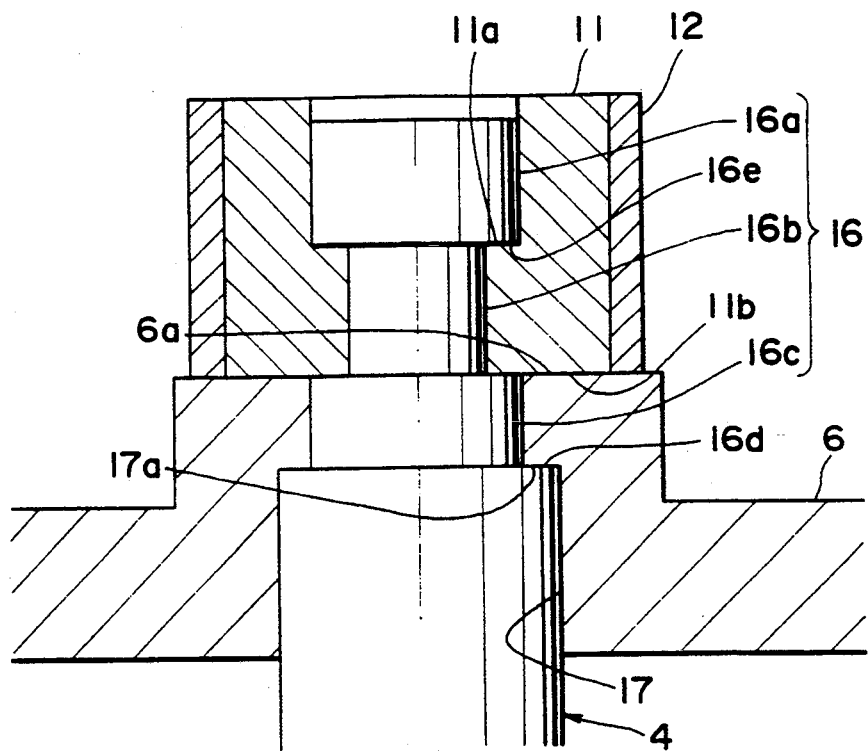
FIG. 2a and 2b show the upper end of a piston rod and a stepped block.
Figure 2B:
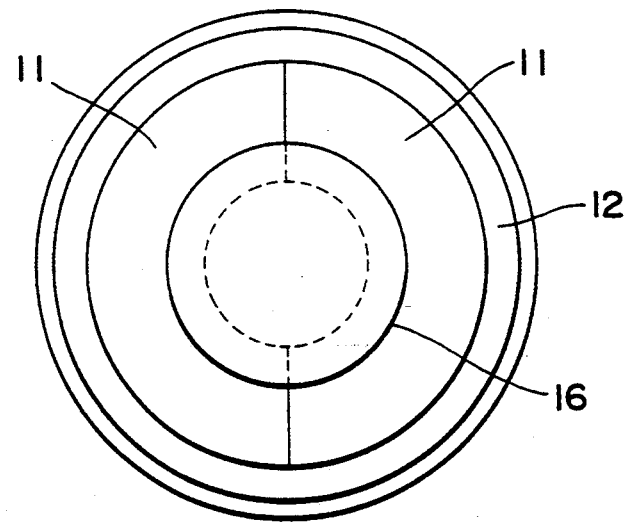
Figure 4:
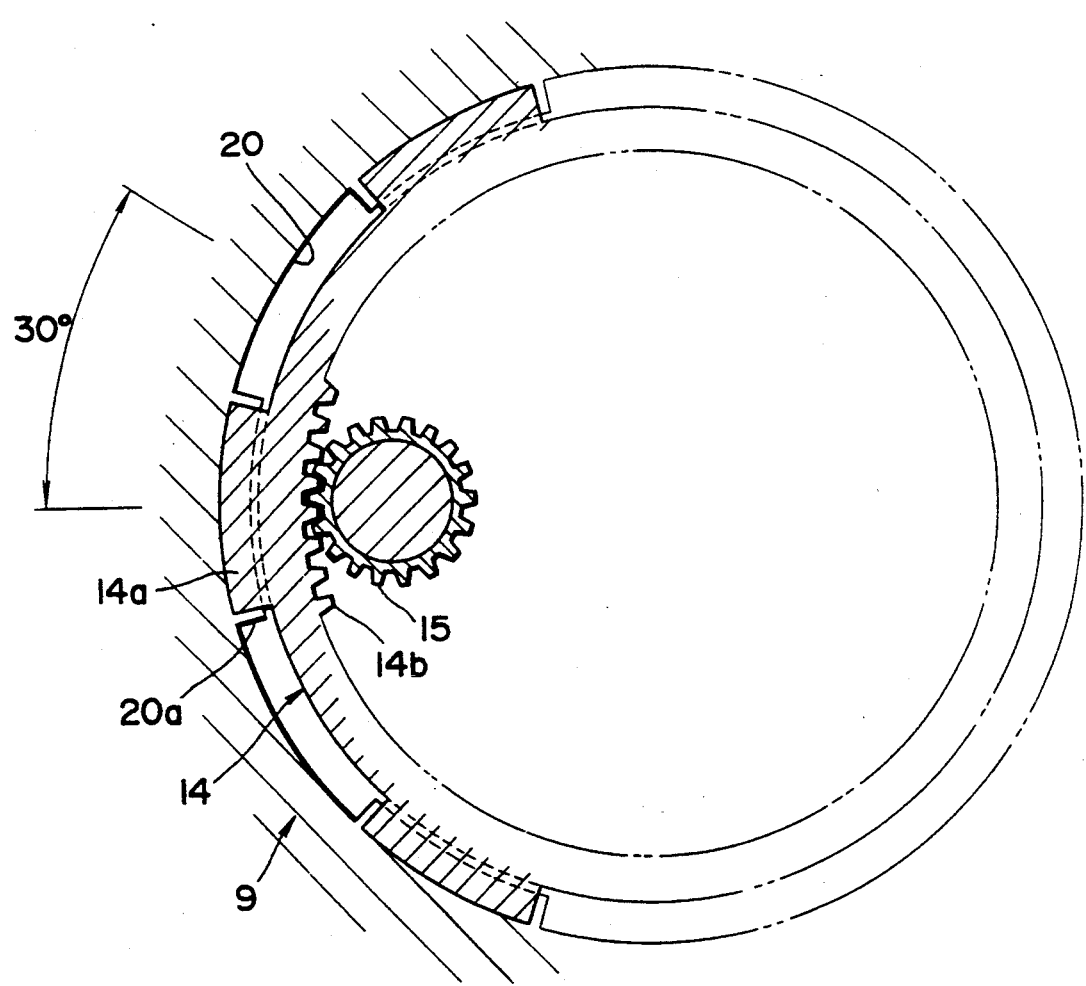
FIG. 4 is a sectional view taken along line A—A of FIG. 3.
Figure 5:
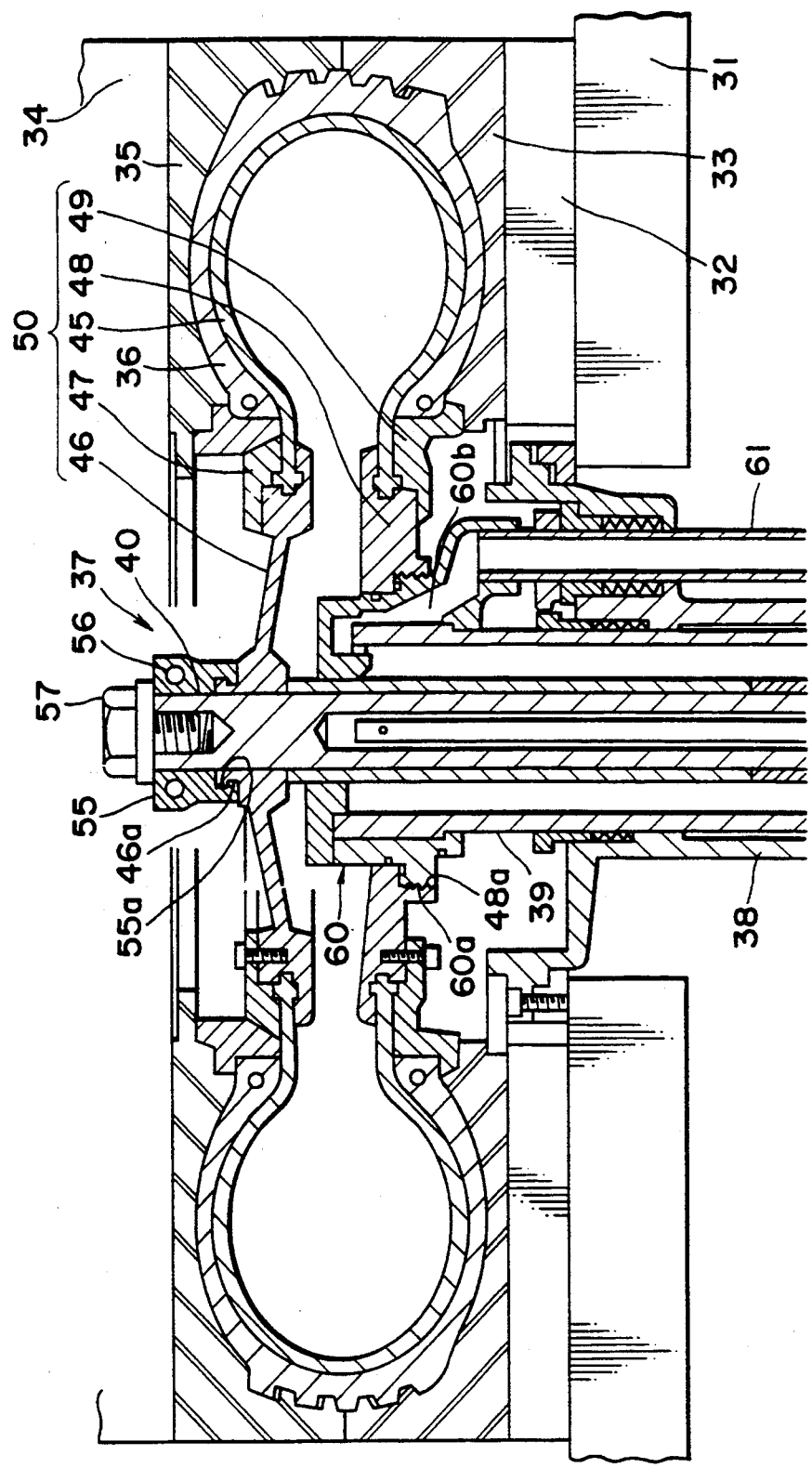
FIG. 5 is a sectional view showing a center mechanism of a conventional tire curing press.

Referring to the accompanying drawings, an embodiment of a center mechanism of a tire curing press according to the present invention will be explained. FIG. 1 is sectional view showing a center mechanism of a tire curing press of the present invention; FIG. 2 is a view showing the upper end of a piston rod and a stepped block; FIG. 2(a) is a longitudinally sectioned front view; FIG. 2(b) is a top view; FIG. 3 is a sectional view showing a lower bead ring and an engaging member; and FIG. 4 is a sectional view taken along line A—A of FIG. 3. The general constitution and operation of the tire curing press are the same as those explained in FIG. 5; hereinafter, therefore, the center mechanism of the tire curing mechanism of the present invention will be explained.

In FIG. 1, the center mechanism 1 is composed of a lift cylinder 3 vertically movably inserted through a guide sleeve 2, a piston rod 4 vertically movably inserted in the lift cylinder 3, and a bladder assembly 10 with the upper end of a bladder 5 held between an upper clamp ring 6 and an upper bead ring 7 and with the lower end held between the lower clamp ring 8 and a lower bead ring 9. The upper clamp ring 6 is removably attached on the upper end of the piston rod 4 by means of a stepped block 11 and a pipe member or sleeve 12, while the lower bead ring 9 is removably installed of the lift cylinder 3 by an engaging member 14 and a gear 15.

The piston rod 4 is provided, on the upper end, with a stepped projecting section 16 consisting of a large-diameter portion 16b, a small-diameter portion 16a and a large-diameter portion 16c, forming a stepped section 16d and 16e as shown in FIG. 2. At the center of the upper clamp ring 6 is formed a through hole 17 having a stepped section 17a which is engaged with the stepped section 16d. The stepped block 11 which is vertically split into two segments has a stepped section 11a so formed as be engaged with the stepped section 16e. A lower surface 11b of this stepped block 11 is in contact with an upper surface 6a of the upper clamp ring 6 and the stepped section 11a is engaged with the stepped section 16e of the stepped projecting section 16, and therefore the stepped block 11 is movable only in the horizontal direction and the horizontal movement of this stepped block 11 restricted by the pipe member 12 into which it is inserted.

As shown in FIGS. 3 and 4, the lower bead ring 9 is provided with a large-diameter bore in which six projecting sections 20a are positioned circumferentially at an equal spacing in the lower part. On the upper part of the engaging member 14 which is rotatably supported in the lift cylinder 3, there are provided six projecting sections 14a which enter the large-diameter bore 20 through between these projecting sections 20a and engage with the upper end 20b of the projecting sections 20a. The engaging member is provided with an internal gear 14b in the lower part, which is in mesh with the external gear 15 rotatably driven by a driving device not illustrated. Back to FIG. 1, the lift cylinder 3 is provided with a lock pin 23 which is vertically installed so as to be inserted into, and removed from, a cylindrical hole 9a made in the lower bead ring Next, the installation and removal procedures of the bladder assembly of the center mechanism of the above-described constitution will be explained. First, the installation procedure will be explained. The bladder assembly 10 is lifted by the use of a lifting equipment such as a forklift truck or other and moved to a position above the center of the curing press. Then, the bladder assembly 10 is lowered until the lower clamp ring 8 and the lower bead ring 9 fit in the lift cylinder 3, and the upper clamp ring 6 fits in the stepped projecting section at the upper end of the piston rod 4. At this time, the projecting section 14a of the engaging member goes into the large-diameter bore 20 through between the projecting sections 20a circumferentially formed in the lower part of the large-diameter bore 20; the lock pin 23 enters the cylindrical hole 9a of the lower bead ring 3; and the stepped section 17a of the upper clamp ring 6 engages with the stepped section 16d of the stepped projecting section 16. Subsequently, turning the gear 15 rotates the engaging member 14 by 30° (one pitch of the projecting section 14a) until the lower end 14c of the projecting section 14a of the engaging member 14 comes into engagement with the upper end 20b of the projecting section 20a of the lower bead ring 9, thus fixing the lower bead ring 9 to the lift cylinder 3. Since the lock pin 23 has been inserted the cylindrical hole 9a of the lower bead ring 9, the rotation of the lower bead ring 9 can be prevented. Next, the stepped block 11 is installed sidewards to the stepped projecting section 16 on the upper end of the piston rod 4, then the stepped section 11a of the stepped block 11 is engaged with the stepped section 16e of the stepped projecting section 16. The horizontal movement of the stepped block 11 is restricted by the pipe member 12 inserted, and the upper clamp ring 6 is fixed to the upper end of the piston rod 4 by means of the stepped block 11.

For the removal of the bladder assembly from the center mechanism, the pipe member 12 is pulled off and then the stepped block 11 is pulled off sidewards, thus releasing the upper clamp ring 6. Then the gear 15 is turned to rotate the engaging member 14 by one pitch of the projecting section 14a until the lower end 14c of the projecting section 14a of the engaging member 14 moves out of engagement with the upper end 20b of the projecting section 20a of the lower bead ring 9, thereby releasing the lower bead ring 9. Then, the bladder assembly is lifted and taken out of the curing press by the use of the lifting equipment. The upper clamp ring 6 can easily be installed to, and removed from, the upper end of the piston rod 4 simply by inserting or pulling off the pipe member 12. Also the lower bead ring 9 can easily be installed to, and removed from, the lift cylinder 3 simply by turning the engaging member 14 by the gear 15. Therefore, the installation and removal of the bladder assembly can easily be performed even at a high temperature and in a limited space, thus improving the rate of operation of the tire curing press.

The present invention, being of the aforesaid constitution, has the following advantages.

The upper support member can easily be installed to, and removed from, the upper end of the piston rod merely by restricting or releasing, by the restricting member, the horizontal movement of the stepped block fixed on the upper end of the piston rod. Therefore, it will become possible to easily carry out the installation and removal of the bladder assembly, providing an improved rate of operation of the tire curing press.

Furthermore, where the lower support member is provided with the large-diameter bore with a plurality of projecting sections in the lower part, and the engaging member is rotatably installed such that it will go into the large-diameter bore of the lower support member through these projecting sections to engage with the upper end of the projecting sections, the lower support member can be installed to, and removed from, the lift cylinder simply by turning to move the engaging member into, or out of, engagement with the upper end of the projecting section of the lower support member; therefore the installation and removal of the bladder assembly can easily be performed even at a high temperature and even in a limited space, thereby obtaining an improved rate of operation of the tire curing press.

What is claimed is:

1. In a tiré curing press, a center mechanism comprising:
   a bladder assembly having upper and lower ends;
   upper and lower support members respectively supporting the upper and lower ends of said bladder assembly;
   a vertically movable piston rod engageable with said upper support member;
   a vertically movable lifting cylinder engageable with said lower support member, wherein said lower support member is non-rotatable with respect to said lifting cylinder; and
   means for removably attaching said lifting cylinder to said lower support member and comprising:
   a) a bore in said lower support member, said lower support member including a plurality of projecting sections extending into said bore,
   b) an engaging member rotatably fitted on said lifting cylinder and being fittable through said bore in said lower support member, said engaging member having projecting sections selectively engageable with the projecting sections of said lower support member to retain said lower support member relative to said lifting cylinder upon rotation of said engaging member, and
   c) a gear mounted in said lifting cylinder for rotating said engaging member with respect to said non-rotating lower support member, such that said projecting sections of said engaging member can selectively engage and disengage with said projecting sections of said lower support member via rotation by said gear.

* * * * *